United States Patent
Edmond et al.

(10) Patent No.: US 9,334,041 B2
(45) Date of Patent: May 10, 2016

(54) AIRCRAFT GLAZING ATTACHMENT

(75) Inventors: George Edmond, Yatton (GB); John Monteith, Swinton (GB); Robert Case, Bristol (GB); Michael Dawson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 712 days.

(21) Appl. No.: 13/556,477

(22) Filed: Jul. 24, 2012

(65) Prior Publication Data
US 2013/0025219 A1 Jan. 31, 2013

(30) Foreign Application Priority Data
Jul. 29, 2011 (GB) .................................. 1113065.5

(51) Int. Cl.
*B64C 1/14* (2006.01)
*B64D 47/06* (2006.01)
*F16B 5/02* (2006.01)
*F16B 31/00* (2006.01)

(52) U.S. Cl.
CPC ............. *B64C 1/1492* (2013.01); *B64C 1/1476* (2013.01); *B64D 47/06* (2013.01); *F16B 5/0241* (2013.01); *F16B 31/00* (2013.01)

(58) Field of Classification Search
CPC ........ F16B 5/0088; F16B 5/02; F16B 5/0208; F16B 5/0216; F16B 5/0225; F16B 5/0233; F16B 5/0241; E06B 3/5436; B64C 1/1476; B64C 1/1484; B64C 1/1492
See application file for complete search history.

(56) References Cited

U.S. PATENT DOCUMENTS

| | | | | |
|---|---|---|---|---|
| 2,834,998 A * | 5/1958 | Wilder | .................. | B64C 1/1492 244/121 |
| 3,061,490 A * | 10/1962 | Ryan | ................. | B32B 17/10036 156/107 |
| 3,382,630 A * | 5/1968 | Chivers | ................. | E06B 3/5436 411/537 |
| 4,284,677 A * | 8/1981 | Herliczek | ......... | B32B 17/10036 219/203 |
| 4,699,335 A * | 10/1987 | DeOms et al. | ............. | 244/129.3 |
| 5,085,383 A * | 2/1992 | Larkin | .................. | B64C 1/1476 244/121 |
| 5,096,255 A * | 3/1992 | Leischner | ................ | B60J 10/02 296/201 |
| 5,540,514 A * | 7/1996 | Demars et al. | ................. | 403/388 |
| 6,138,434 A * | 10/2000 | Demars et al. | ............. | 52/786.13 |
| 6,430,894 B1 * | 8/2002 | Chae et al. | .................... | 52/786.1 |
| 7,654,061 B2 * | 2/2010 | Schaumberger et al. | .. | 52/786.11 |
| 8,375,680 B2 * | 2/2013 | Clair et al. | ................. | 52/786.13 |
| 8,695,527 B2 * | 4/2014 | Edmond | ................ | B64D 45/00 116/208 |
| 2007/0227096 A1 * | 10/2007 | Schaumberger et al. | .. | 52/786.11 |

(Continued)

FOREIGN PATENT DOCUMENTS

CN 101519119 A 3/2009
DE 3517410 A1 5/1986
(Continued)

OTHER PUBLICATIONS

UK Search Report for Application No. GB1113065.5, dated Nov. 6, 2011.
Communication/EP Search Report in EP Appln No. 12176225.6, dated Sep. 24, 2015.

*Primary Examiner* — Andrew J Triggs
(74) *Attorney, Agent, or Firm* — Hauptman Ham, LLP

(57) ABSTRACT

A glazing unit is provided in which a two part bush is provided such that relative movement between a fastener, a glazing component and a wing skin is permitted, thus avoiding stress concentrations and lowering risk of damage in use.

24 Claims, 6 Drawing Sheets

(56) References Cited

U.S. PATENT DOCUMENTS

2011/0023391 A1* 2/2011 Clair et al. ............... 52/204.593
2012/0311846 A1* 12/2012 Twelves .................... B64C 9/02
  29/525.04
2013/0025219 A1* 1/2013 Edmond et al. .............. 52/204.7

FOREIGN PATENT DOCUMENTS

| EP | 0 692 641 A2 | 1/1996 |
| GB | 626013 A | 7/1949 |
| GB | 2 045 377 A | 10/1980 |
| WO | 03033848 A2 | 4/2003 |

* cited by examiner

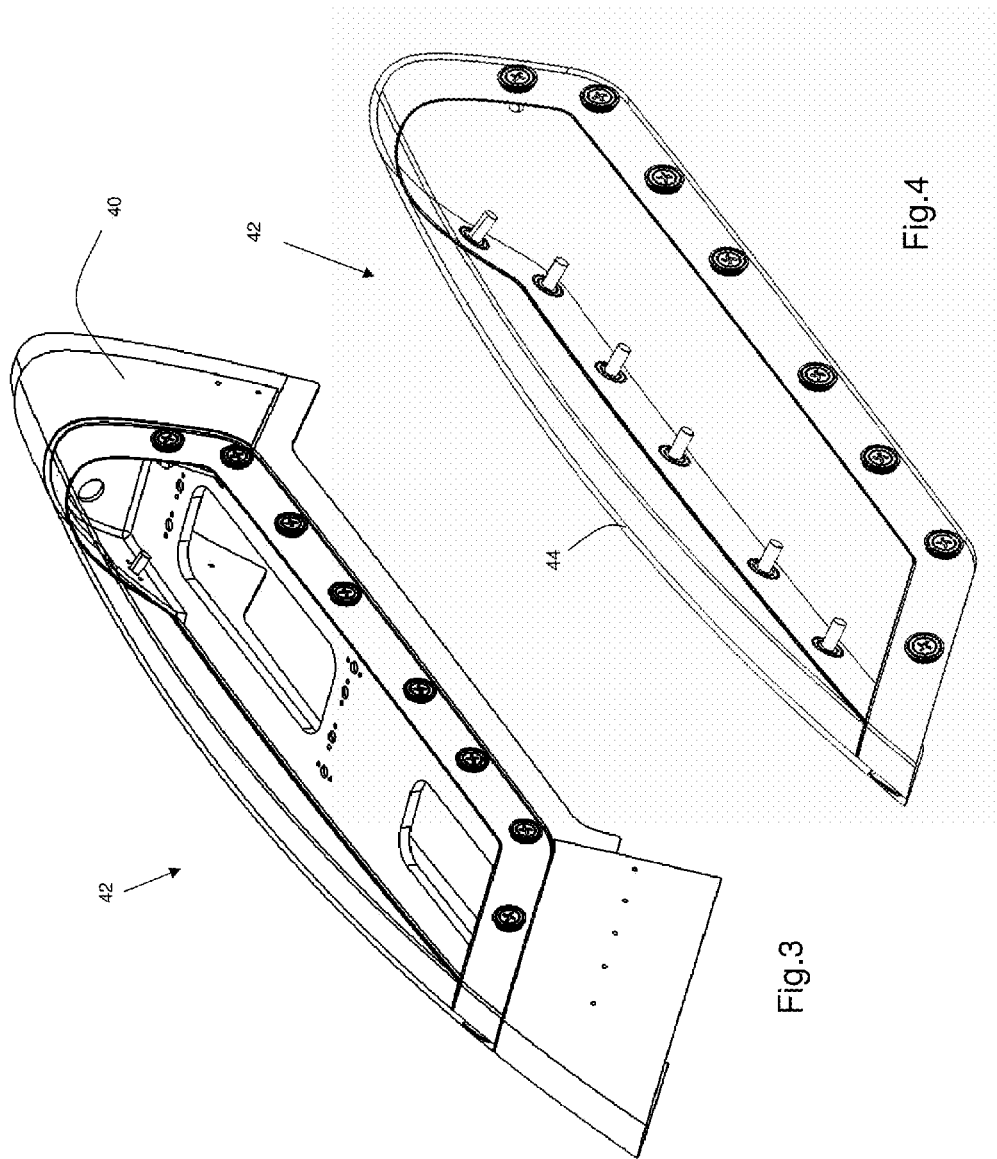

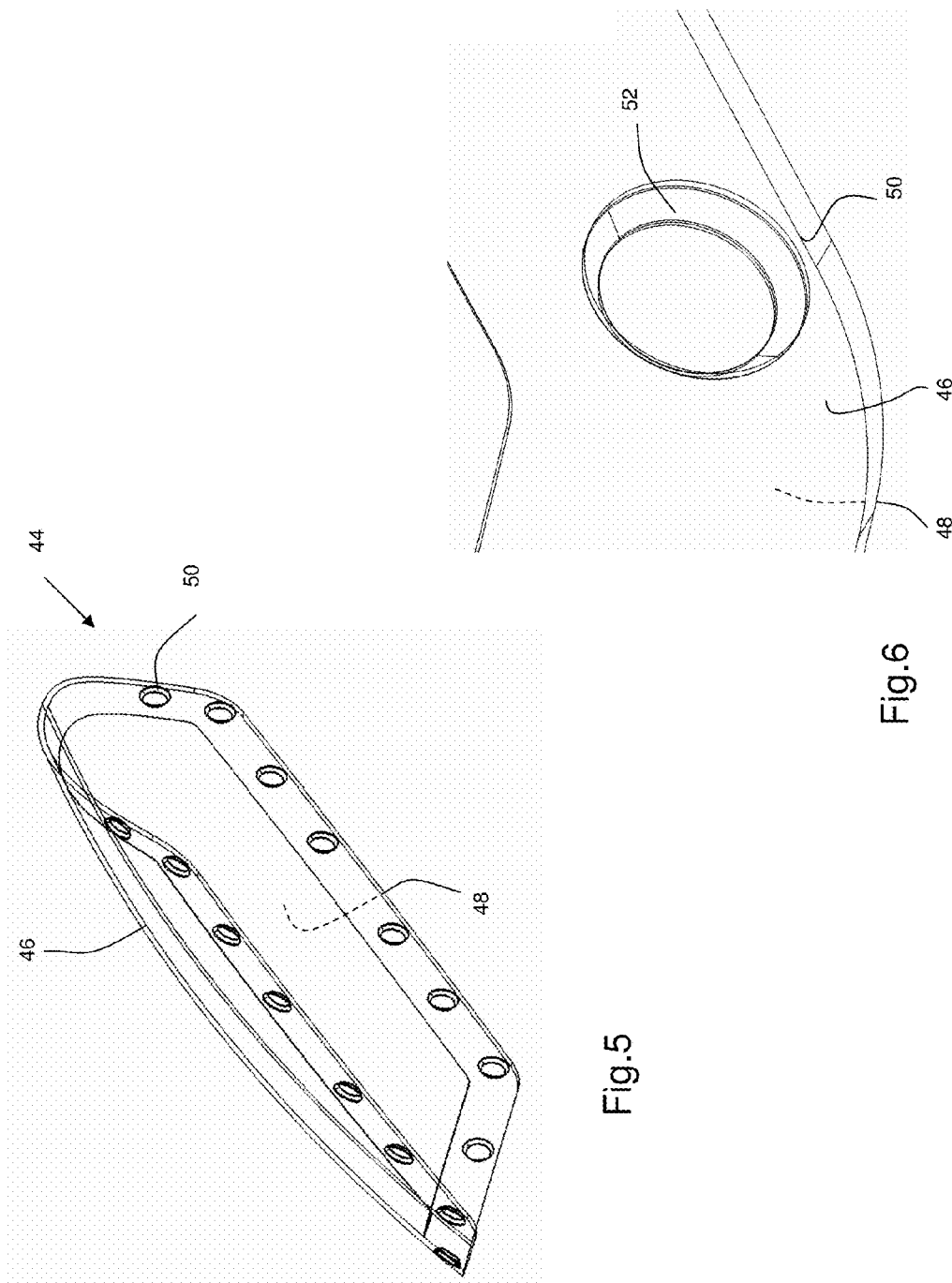

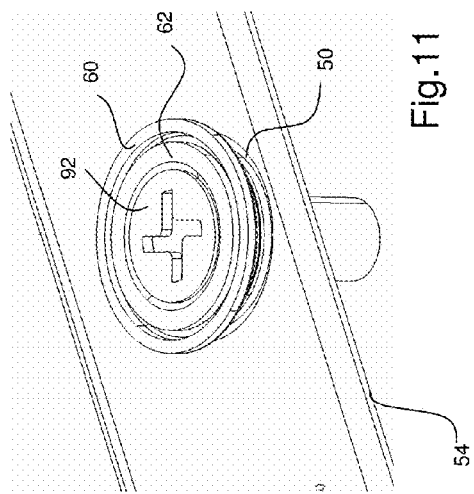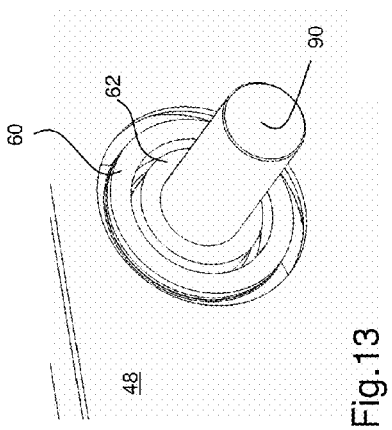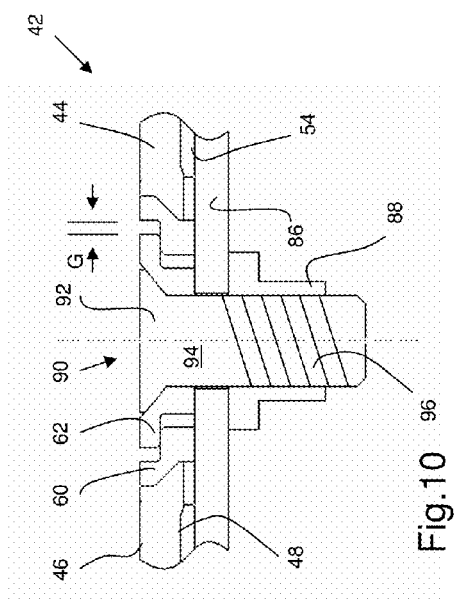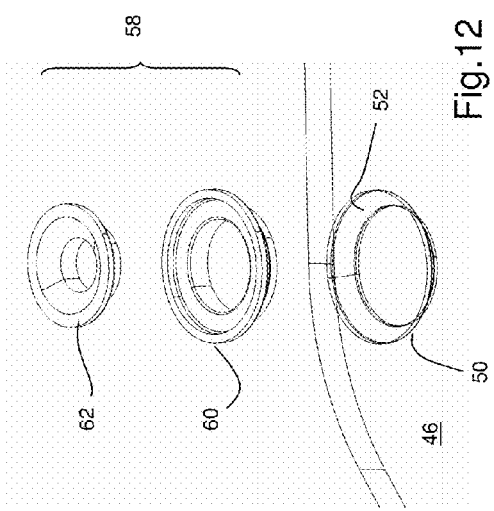

AIRCRAFT GLAZING ATTACHMENT

RELATED APPLICATIONS

The present application is based on, and claims priority from, Great Britain Application Number 1113065.5, filed Jul. 29, 2011, the disclosure of which is hereby incorporated by reference herein in its entirety.

The following invention is concerned with an aircraft glazing apparatus. More specifically, the following invention is concerned with an aircraft light glazing apparatus having attachment apparatus for installation on the wings and/or wingtips of aircraft.

Regulations stipulate that aircraft must have various lights installed on their wings. Because the smooth aerodynamic surface of the wings is important for performance and efficiency, known aircraft lighting systems often employ illumination means recessed within the wing body, which are covered by aerodynamic glazing units which conform to the profile of the wing.

Known glazing units comprise an acrylic glazing component, which glazing component is mounted in a composite frame layered with a metallic strip around the perimeter. The acrylic glazing component is captured in a recess of the composite frame and held in situ by the metallic strip. Countersunk bores are provided through both the composite frame and the metallic strip in order to receive appropriate fasteners. When the glazing unit is installed on the wing, fasteners are passed through the bores and fastened to a captured bolt on the inside of the wing substructure. The intention of the metallic strip is to both clamp the acrylic between the metal and the composite and to provide a protective surface for the head of the fastener to bear upon.

This solution has various problems. Because of the difference in stiffness between the acrylic material, the composite and the metallic components (i.e. the wing substructure and the strip) relative movement occurs, for example under aerodynamic loads. In such situations, the distance between adjacent fasteners remains constant (due to the fact they are attached to the relatively stiff metal wing substructure) but the acrylic component is able to flex and move. This movement can result in cracks forming, particularly around stress raisers in the acrylic. Such crack formation necessitates frequent replacement of the glazing unit. This is undesirable as it increases the total amount of time that the aircraft must spend out of service in order to regularly replace the glazing units.

Furthermore, due to the nature of the metallic fasteners, if they are installed incorrectly or there is some misalignment between the bores in the captured bolt and the composite and/or the metal strip, pressure points may develop around the circumference of the fastener. This may also necessitate more frequent replacement of the acrylic glazing component due to damage to the metal strip.

It is an aim of the present invention to overcome one or more of the above mentioned problems.

According to a first aspect of the present invention, there is provided an aircraft glazing apparatus comprising: a glazing component defining a bore, a bush located within the bore, the bush defining a fastener receiving formation, in which the bush is configured to permit relative movement between the glazing component and the fastener receiving formation.

Advantageously, this arrangement reduces the risk of damage due to different levels of strain/deformation in the glazing component and the component to which the fastener is attached.

Preferably the bush comprises a first part engaged with the glazing component and a second part defining the fastener receiving formation, in which the first part and the second part are relatively movable.

This facilitates movement between the glazing component and e.g. a wing substructure.

Preferably the second part is loosely engaged in the first part, and may be movable relative to the first part in a direction perpendicular to a main axis of the fastener receiving formation. Preferably the second part is movable relative to the first part in all directions perpendicular to the main axis of the fastener receiving formation.

Preferably the first and second parts each define a bearing surface, which bearing surfaces are in sliding engagement and which lie generally perpendicular to the main axis of the fastener receiving formation.

The first part may define an at least partially frustroconical outer surface engaged with a corresponding frustroconical surface of the bore of the glazing component. This allows the fastener to be retrofitted to existing glazing components.

Preferably one of the first and second parts is constructed from a first material having a higher stiffness than a second material from which the other of the first and second parts is constructed. More preferably the first material is metallic, and the second material is an elastomer. Even more preferably the first part is constructed from the first material.

This facilitates movement through deformation of the less stiff component, as well as spreading the clamping load more evenly to avoid load concentrations.

Preferably the fastener receiving formation comprises a countersunk bore.

Preferably the bush is constructed from an elastomer. This is an alternative to the two part construction in which the entire bush could be constructed from an elastomer in order to both distribute load and allow movement.

According to a second aspect of the invention there is provided an aircraft glazing attachment apparatus comprising: a first bush part comprising a male frustroconical outer profile, a second bush part defining a fastener receiving formation, in which the second bush part is configured to be movably mounted within the first bush part in use.

Advantageously, this arrangement reduces the risk of damage due to different levels of strain/deformation in the glazing component and the component to which the fastener is attached.

Preferably the second part is movable relative to the first part in a direction perpendicular to a main axis of the fastener receiving formation. More preferably the second part is movable relative to the first part in all directions perpendicular to the main axis of the fastener receiving formation.

Preferably the first and second parts each define a bearing surface, which bearing surfaces are in sliding engagement and which lie generally perpendicular to the main axis of the fastener receiving formation.

Preferably one of the first and second parts is constructed from a first material having a higher stiffness than a second material from which the other of the first and second parts is constructed. More preferably the first material is metallic, and the second material is an elastomer. Even more preferably the first part is constructed from the first material.

This facilitates movement through deformation of the less stiff component, as well as spreading the clamping load more evenly to avoid load concentrations.

An example aircraft glazing apparatus according to the present invention will now be described with reference to the figures in which:—

FIG. 3 is a perspective view of a glazing unit in accordance with the present invention in an installed condition;

FIG. 4 is a perspective view of the glazing unit of FIG. 3 in an assembled but uninstalled condition;

FIG. 5 is a perspective view of an acrylic glazing component of the glazing unit of FIG. 3;

FIG. 6 is a close-up view of a part of the glazing component of FIG. 5;

FIG. 10 is a section view of a part of the glazing unit of FIG. 3;

FIG. 11 is a perspective view of a part of the glazing unit of FIG. 3;

FIG. 12 is an exploded perspective view of a part of the glazing unit of FIG. 3;

FIG. 13 is a rear view of a part of the glazing unit of FIG. 3; and,

Figure 1:
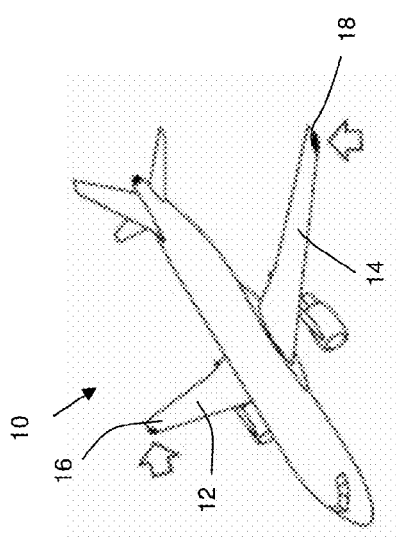
FIG. 1 is a perspective view of an aircraft.

Turning to FIG. 1 an aircraft 10 has a first wing 12 and a second wing 14. Each wing 12, 14 is provided with a navigation light 16, 18 respectively.

Figure 2:
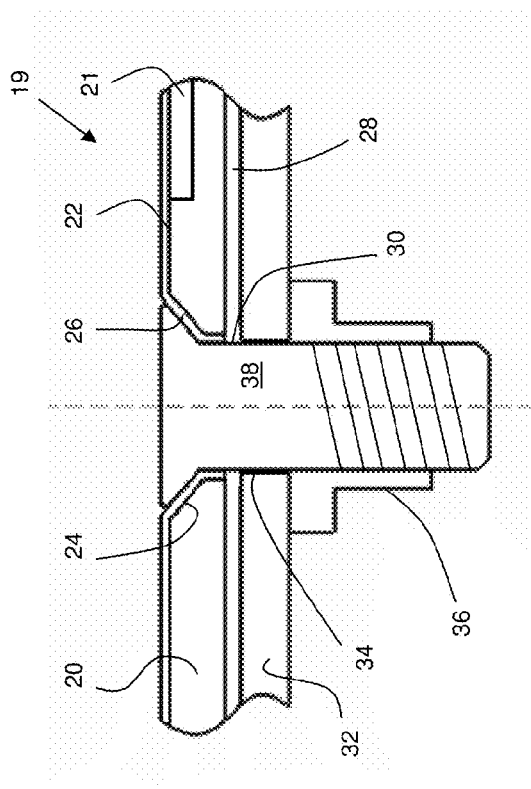
FIG. 2 is a side section view of a prior art fastening apparatus.

Turning to FIG. 2, a part of a glazing unit 19 of the navigation light 16 is shown. In particular, the fastening area of the unit 19 is shown.

The unit 19 comprises an acrylic glazing component 21. The component 21 is mounted in a composite frame 20, shown in section at its periphery and having a metallic strip 22 installed about its periphery on an exterior surface thereof. The composite frame 20 defines a countersunk bore 24. A corresponding countersunk bore 26 is punch formed in the metallic strip 22. The metallic strip 22 is extruded in the region of the bore 26 to pass all the way through the thickness of the composite frame 20.

A rubber seal 28 is provided beneath the acrylic glazing component 20 and defines a bore 30. A substructure 32 of the wing 12 is machined from metal and defines a bore 34 which is provided with a captive nut 36 riveted to the underside thereof.

A fastener 38, (in this case a screw), is passed through the aligned bores of the metallic strip 22, the composite frame 20, the seal 28 and the skin 32 to engage with the nut 36. As it is tightened in position, the acrylic component 21 is clamped between the composite frame 20 and the strip 22.

As described in the introduction, this method of attachment is often problematic as, should the nut 36 not be properly aligned (due to manufacturing tolerances) with the other bores, high stress regions can form around the perimeter of the bore 24 potentially causing damage. Furthermore, any relative movement between the various components due to loads experienced in flight, may cause damage to the glazing unit 20 due to the inflexible nature of the joint.

Turning to FIG. 3, a part of an aircraft wing 40 is shown comprising a glazing unit 42 in accordance with the present invention.

The glazing unit 42 comprises an acrylic glazing component 44 (shown in isolation in FIG. 5) defining a generally curved profile having an exterior surface 46 and an interior surface 48. A series of countersunk bores 50 (each defining a frustro conical surface 52 tapering outwardly towards the exterior surface 46) are provided around the periphery of the glazing component 44.

Figure 7:
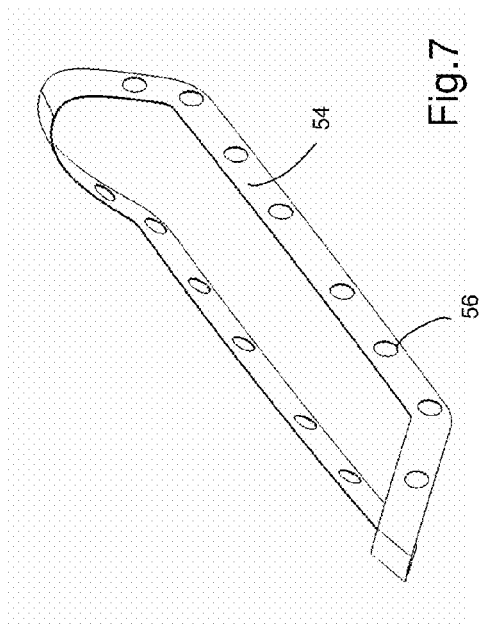
FIG. 7 is a perspective use of a sealing strip of the glazing unit of FIG. 3.

The glazing unit 42 further comprises an elastomeric sealing strip 54 (shown in FIG. 7) which has the same peripheral shape as the glazing component 44 and defines a corresponding plurality of bores 56.

Figure 9:
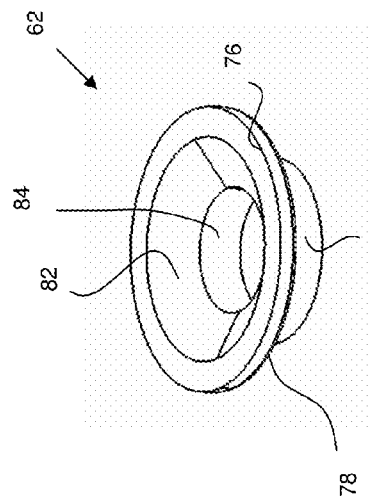
FIG. 9 is a perspective view of an interior bush component of the glazing unit of FIG. 3.
Figure 8:
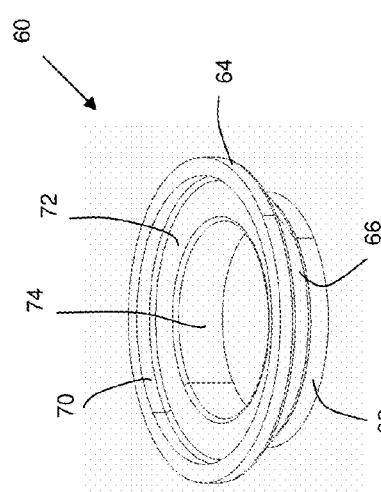
FIG. 8 is a perspective view of an exterior bush component of the glazing unit of FIG. 3.

A bush 58 (see FIG. 12) is also provided for each bore 50, comprising an outer bush 60 (FIG. 8) and an inner bush 62 (FIG. 9).

The outer bush 60 is a ring-like component with an outer surface defining a first cylindrical surface 64, joined to a frustro conical surface 66 which tapers radially inwardly to a second, smaller diameter, cylindrical surface 68. The inner surface of the outer bush 60 is defined by a third cylindrical surface 70 leading to an annular shoulder 72 which in turn leads to a fourth, smaller diameter, cylindrical surface 74.

Turning to the inner bush 62, the outer surface thereof has a first cylindrical surface 76, leading to an annular shoulder 78 which in turn leads to a second, smaller diameter, cylindrical surface 80. The inner surface of the inner bush 62 defines a countersunk bore having a frustroconical surface 82 which tapers radially inwardly to a third cylindrical surface 84.

The outer bush 60 is constructed from a metallic material. The inner bush 62 is constructed from more deformable, preferably rubber, material.

In a similar manner to the prior art embodiment shown in FIG. 2, the wing 40 defines a wing skin 86 as shown in FIG. 10, having a captured nut 88 welded on an inner surface thereof. The captured nut 88 defines an interior threaded formation for receiving a suitable fastener as will be described below.

A fastener 90 is also provided in the form of a screw having a head 92 and a shaft 94, which defines a threaded portion 96 arranged to engage the nut 88.

In order to assemble the glazing unit 42, the external bush 60 is bonded to the glazing component 44 (for example with adhesive) such that the frustroconical surfaces 52, 66 are bonded together. The interior bush 62 is placed into the exterior bush 60 as shown in FIG. 10. The glazing component 44 is then placed over the aperture in the wing skin 86 with the sealing strip 54 sandwiched therebetween such that the bores 50, 56, align. The bores of the interior and exterior bushes 60, 62 are aligned such that the fastener 92 can be passed therethrough and fasten against the nut 88. It will be understood that the head of the fastener 92 engages against the frustroconical surface 82 of the interior bush 62 such that a clamping force is applied.

As shown in FIG. 10, a clearance between the bushes 60, 62 allows for a gap G to be formed therebetween and around the entire circumference of the interior bush 62. This allows for relative sliding movement between the two components to account for any misalignment or play when the fastener 90 is installed. Furthermore, because the interior bush 62 is constructed from a elastomer it distributes the compressive load produced by the fastener 90 around the circumference of the bush 58. This deformation also prevents any stress concentrations from occurring and results in an even clamping force on the glazing unit 44.

Figure 14:
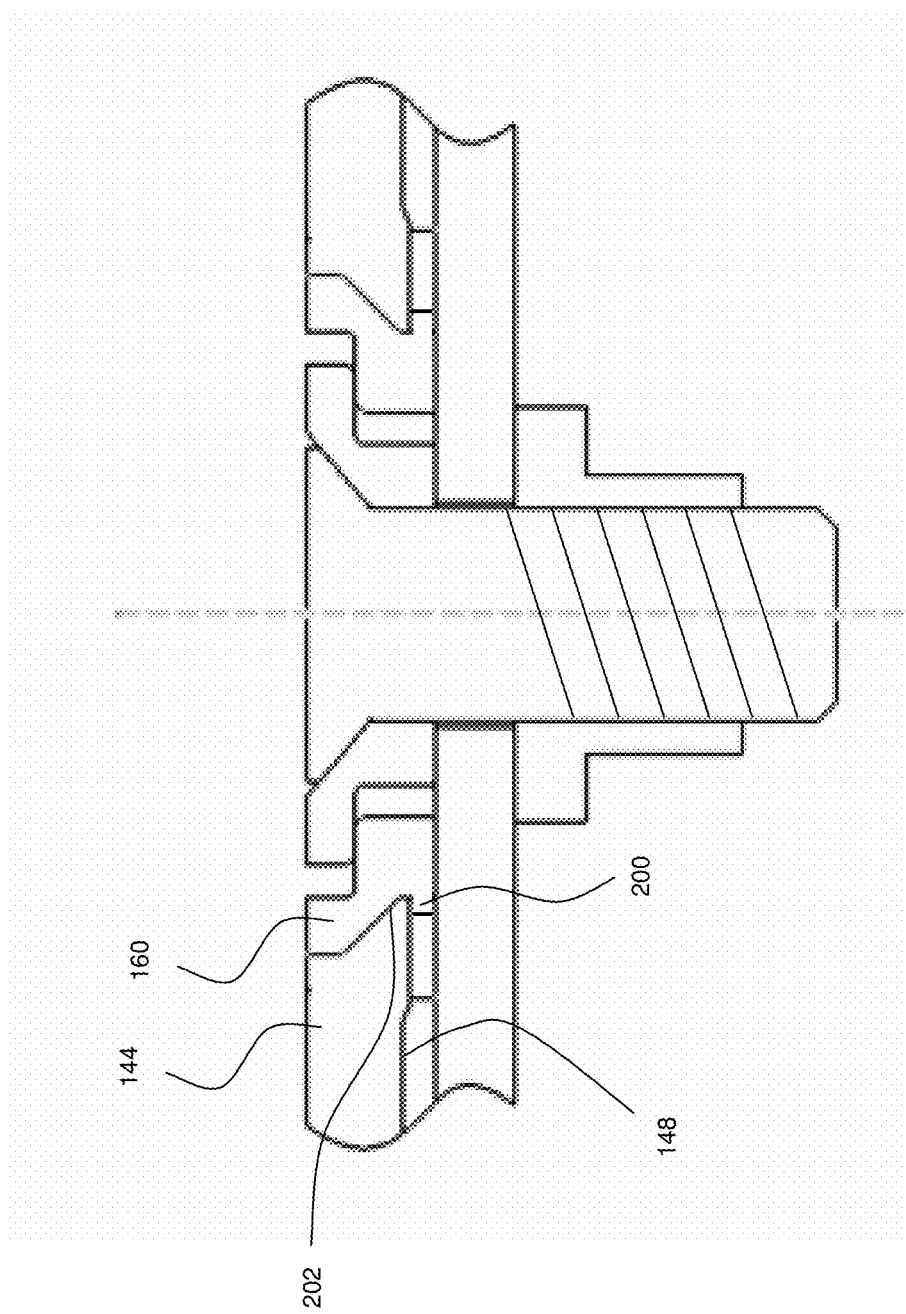
FIG. 14 is a section view of a part of an alternative glazing unit in accordance with the present invention.

Turning to FIG. 14, an arrangement similar to that of FIG. 10 is shown, with reference numerals for like components 100 greater. The outer bush 160 defines a radially outwardly projecting annular lip or flange 200 formed by an undercut 202 in the radial outer wall of the bush 160. The flange 200 is arranged to sit under the radially inner part of the acrylic 44, engaged with the inner surface 148 thereof. As such, the outer bush 160 is mechanically locked to the acrylic 144.

Variations fall within the scope of the present invention.

It is envisaged that the bush 58 may be a one piece component constructed from a soft material such as an elastomer. Relative movement between the glazing unit and the wing is thereby permitted by deformation of the bush.

It is also envisaged that the bush may be a two part assembly (as described in the above embodiment), with both components being stiff and metallic. Although the benefits of load distribution are not as evident, relative movement will be permitted which provides the benefit of allowing the components to deform to different extents.

The fastener need not be a screw, but may be any other type of mechanical fastener.

The invention claimed is:

1. An aircraft glazing apparatus comprising:
an aircraft glazing component defining a bore,
a bush located within the bore, the bush comprising a first part engaged with the aircraft glazing component to move with the glazing component and a second part defining a fastener receiving formation,
in which, during use, the first part is movable together with the aircraft glazing component relative to the second part to permit relative movement between the aircraft glazing component and the fastener receiving formation.

2. The aircraft glazing apparatus according to claim 1 in which the second part is non-fixedly engaged in the first part.

3. The aircraft glazing apparatus according to claim 2 in which the second part is movable relative to the first part in a direction perpendicular to a main axis of the fastener receiving formation.

4. The aircraft glazing apparatus according to claim 3 in which the second part is movable relative to the first part in all directions perpendicular to the main axis of the fastener receiving formation.

5. The aircraft glazing apparatus according to claim 4 in which the first and second parts each define a bearing surface, which bearing surfaces are in sliding engagement and which lie generally perpendicular to the main axis of the fastener receiving formation.

6. The aircraft glazing apparatus according to claim 1 in which the first part defines an at least partially frustroconical outer surface engaged with a corresponding frustroconical surface of the bore of the aircraft glazing component.

7. The aircraft glazing apparatus according to claim 1 in which one of the first and second parts is constructed from a first material having a stiffness which is greater than the stiffness of a second material from which the other of the first and second parts is constructed.

8. The aircraft glazing apparatus according to claim 7 in which the first material is metallic, and the second material is an elastomer.

9. The aircraft glazing apparatus according to claim 7 in which the first part is constructed from the first material.

10. The aircraft glazing apparatus according to claim 1 in which the fastener receiving formation comprises a countersunk bore.

11. The aircraft glazing apparatus according to claim 1 in which the bush is constructed from an elastomer.

12. The aircraft glazing apparatus according to claim 1, in which the second part protrudes through the first part and the second part is configured to locate against the aircraft component.

13. The aircraft glazing apparatus according to claim 1, further comprising a fastener receivable in the fastener receiving formation, the fastener being configured to attach the aircraft glazing component to an aircraft component.

14. The aircraft glazing apparatus according to claim 1 in which the first part is configured to be spaced from the fastener.

15. An aircraft glazing attachment apparatus comprising:
a first bush part comprising a male frustroconical outer profile,
a second bush part defining a fastener receiving formation,
the fastener receiving formation being configured to receive a fastener which is attachable to an aircraft component,
in which the second bush part is configured to be movably mounted within the first bush part in use, and,
at least a portion of the first bush part is configured to be received between the second bush part and the aircraft glazing component.

16. The aircraft glazing attachment apparatus according to claim 15 in which the second part is movable relative to the first part in a direction perpendicular to a main axis of the fastener receiving formation.

17. The aircraft glazing attachment apparatus according to claim 16 in which the second part is movable relative to the first part in all directions perpendicular to the main axis of the fastener receiving formation.

18. The aircraft glazing attachment apparatus according to claim 17 in which the first and second parts each define a bearing surface, which bearing surfaces are in sliding engagement and which lie generally perpendicular to the main axis of the fastener receiving formation.

19. The aircraft glazing attachment apparatus according to claim 15 in which one of the first and second parts is constructed from a first material having a stiffness which is greater than the stiffness of a second material from which the other of the first and second parts is constructed.

20. The aircraft glazing attachment apparatus according to claim 19 in which the first material is metallic, and the second material is an elastomer.

21. An aircraft glazing attachment apparatus according to claim 19 in which the first part is constructed from the first material.

22. The aircraft glazing attachment apparatus according to claim 15 in which the first bush part is mechanically locked to an aircraft glazing component.

23. The aircraft glazing attachment apparatus according to claim 22 in which the first bush part defines a radial undercut to receive the aircraft glazing component.

24. An aircraft glazing apparatus, comprising:
an aircraft glazing component defining a bore,
a bush located within the bore, the bush comprising a first part engaged with the glazing component and a second part defining a fastener receiving formation,
in which, during use, the first part and the second part are relatively movable to permit relative movement between the aircraft glazing component and the fastener receiving formation, and
in which the first and second parts each define a bearing surface, which bearing surfaces are in sliding engagement and which lie generally perpendicular to the main axis of the fastener receiving formation,
a space being formed between the first and second parts on both sides of the sliding engagement in a direction of the main axis of the fastener receiving formation.

* * * * *